United States Patent [19]
Edwards et al.

[11] Patent Number: 5,416,880
[45] Date of Patent: May 16, 1995

[54] OPTICAL FIBRE COATINGS AND METHOD FOR PRODUCING SAME

[75] Inventors: Martin R. Edwards, Chester; Julie A. Waller, Antrobus; Stephen Byrne, Guisborough, all of England

[73] Assignee: Zeneca Limited, London, England

[21] Appl. No.: 218,298

[22] Filed: Mar. 28, 1994

Related U.S. Application Data

[63] Continuation of Ser. No. 958,057, Oct. 8, 1992, abandoned.

[30] Foreign Application Priority Data

Oct. 11, 1991 [GB] United Kingdom ................ 9121655

[51] Int. Cl.⁶ ........................ G02B 6/22; B05D 5/06; C08F 2/46
[52] U.S. Cl. .................... 385/128; 385/143; 385/144; 427/163.2; 522/96; 65/447
[58] Field of Search ........... 385/128, 144, 145, 141, 385/142; 522/96, 92, 97; 526/301; 427/163; 65/378, 385, 443, 447, 450

[56] References Cited

U.S. PATENT DOCUMENTS

| | | | |
|---|---|---|---|
| 4,164,486 | 8/1979 | Kudo et al. | 260/22 |
| 4,183,796 | 1/1980 | Ansel et al. | 204/159.23 |
| 4,609,718 | 9/1986 | Bishop et al. | 385/128 X |
| 4,690,501 | 9/1987 | Zimmerman et al. | 385/141 X |
| 4,690,502 | 9/1987 | zimmerman et al. | 385/128 X |
| 4,690,503 | 9/1987 | Janssen et al. | 385/141 X |
| 4,798,852 | 1/1989 | Zimmerman et al. | 385/128 X |
| 5,146,531 | 9/1992 | Shustack | 385/128 |
| 5,146,531 | 9/1992 | Shustack . | |
| 5,257,339 | 10/1993 | Darsey | 385/128 |
| 5,320,904 | 6/1994 | Mitchell | 385/128 |

FOREIGN PATENT DOCUMENTS

| | | | |
|---|---|---|---|
| 0209641 | 1/1987 | European Pat. Off. | 385/128 X |
| 0241027 | 10/1987 | European Pat. Off. | 385/128 X |
| 0336653 | 10/1989 | European Pat. Off. | 385/128 X |
| 58-29814 | 2/1983 | Japan | 385/128 X |
| 58-29814 | 2/1983 | Japan . | |

OTHER PUBLICATIONS

Derwent Publications, Ltd. JP-A-4 077 514, Abstract, Mar. 11, 1993.
JP-A-54 069 200 Abstract, Jun. 2, 1979.

*Primary Examiner*—Brian Healy
*Attorney, Agent, or Firm*—Cushman, Darby & Cushman

[57] ABSTRACT

The use of an ethylenically-terminated urethane oligomer for the provision of a radiation-cured coating material of an optical fiber, the urethane oligomer being derived from reactants which include a hydroxyl-terminated polyester polyol having dimer acid residues in its structure.

15 Claims, 1 Drawing Sheet

OPTICAL FIBRE COATINGS AND METHOD FOR PRODUCING SAME

This is a continuation of Application Ser. No. 07/958,057, filed on Oct. 8, 1992, which was abandoned upon the filing hereof.

The present invention relates to the use of certain urethane oligomers for providing the coating material of an optical fibre, to the resulting coated optical fibre, and to the method of producing the optical fibre.

Figure 1:
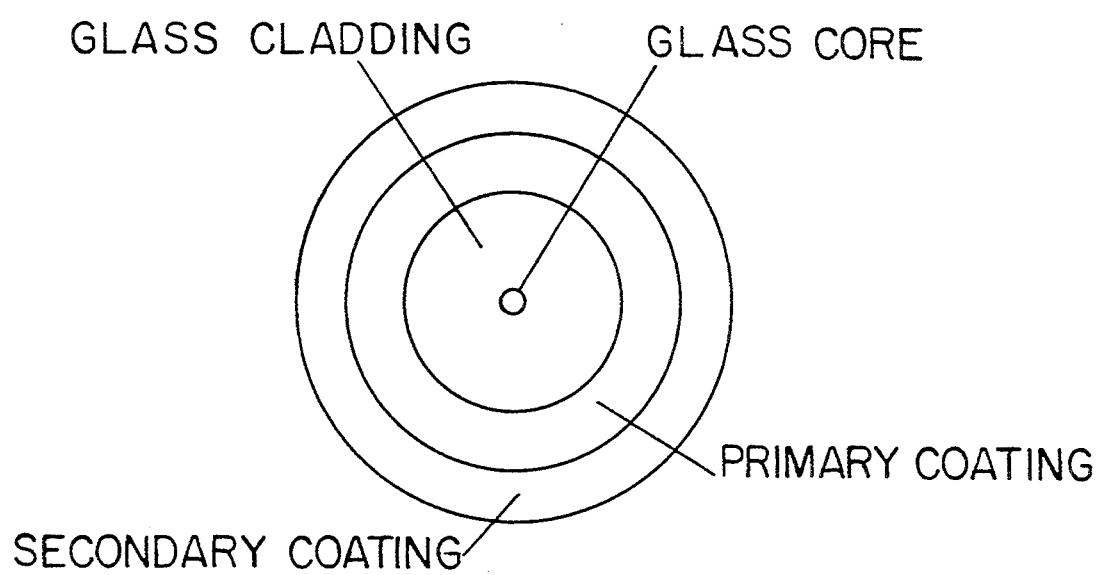
FIG. 1 shows a glass core surrounded by a glass cladding which has a primary and secondary polymer coating.

Optical fibres are widely used in the communications field because of their ability to carry large amounts of information over long distances. They are normally made of silica glass, although polymer clad silica fibres and polymer core fibres are known. In order to protect the fibres from physical damage and also from deterioration due to environmental agencies such as water, it is conventional to apply at least one protective coating to the freshly drawn fibres as an integral part of the production process. Thus, the protective coating(s) is applied "in-line", i.e. after the fibre is drawn from the molten preform but before the fibre is taken up onto the winding drum. Materials that cure on exposure to radiation such as ultraviolet light are favoured in the industry due to their rapid cure rate, enabling the coated fibre to be produced at high speed. Curable liquid material containing (usually) photoinitiator is applied to the fibre and curing is effected by (usually) ultraviolet radiation using an appropriate radiation source (e.g. ultraviolet lamps). Formulations comprising ethylenically-terminated urethane oligomers, as typified by urethane-acrylate oligomers (reference to which in the following description will for convenience be generally used for representing ethylenically-terminated urethane oligomers in the broader sense) and copolymerisable ethylenically unsaturated liquid solvents therefor, the latter often being called "reactive diluents" in the art, (both types of material being well known in the optical fibre coating art), are especially favoured due to their low viscosity, rapid cure response and the desired physical properties of the cured coatings.

Because of the difficulty of achieving all the required properties in a single coating, an optical fibre is frequently provided with at least two polymeric coatings. A soft primary buffering coating of low modulus and low glass transition temperature (Tg) is applied nearest to (usually directly contacting) the optical fibre, having an ability (inter alia) to cushion the fibre from mechanical stresses and to avoid microbending problems which would lead to attenuation of signal. A harder (higher Tg), higher modulus secondary coating is applied on top of the primary coating to provide (inter alia) toughness, abrasion resistance, and general ease of handling. The primary layer can be cured before the application of the secondary, or after so that both layers are cured at the same time. (A coated optical fibre may also have one or more further coatings in addition to the primary and secondary coatings to ameliorate still further the properties of the protective coating as a whole; such further coatings may be outer to or inside the secondary coating. They can be based on cured urethane-acrylate formulations or be derived from other polymeric materials).

In addition to properties required specifically for the primary and secondary coatings (as discussed supra), there are several requirements common to both. It is important that the coatings have low water absorption. High water uptake leads to a reduction in the coating strip force when the fibre is wet as compared to the dry value and reduced primary glass adhesion, leading to potential delamination. In addition if thermoplastics such as nylon are extruded over the coated fibres absorbed water will evaporate leading to the formation of bubbles and voids in the coatings. Coatings should also show low extractables, i.e. there should be little unpolymerised material that can be extracted into water, organic solvents, or cable filling gels.

Additionally the desirable levels of properties such as modulus, elongation, Tg, and adhesion which are shown by the coatings when just cured must be maintained after the coated fibre is subjected to aggressive environments over relatively long periods of time. Such aggressive conditions include high temperatures and/or high humidities, immersion in water (including at high temperatures) and exposure to various chemicals. Since the expected fibre lifetime is up to 25 years, accelerated ageing tests are normally employed to gauge the stability of coatings.

As mentioned supra, urethane-acrylate oligomers are well known for use in formulations that will provide radiation-cured coatings for optical fibres; in such formulations they are often used in conjunction with copolymerisable ethylenically unsaturated liquid solvents therefor ("reactive diluents") and usually other components such as photo initiators. As is well known in the art, urethane-acrylate oligomers are usually derived from reactants which include a polyol, an organic diisocyanate and an ethylenically unsaturated monomer containing a (usually single) hydroxyl group(s), typically a hydroxy-functional (meth)acrylate ester (in some cases, an isocyanate-functional (meth)acrylate ester being used in place of diisocyanate and hydroxy-functional (meth)acrylate ester).

The polyol component of the urethane-acrylate oligomer is often an oligomeric material such as a polyether polyol, a polyester polyol, a polycarbonate polyol or a polysiloxane polyol. Such oligomeric polyols will have an average at least 2 hydroxyl groups per molecule, which are usually located at least at the ends of the oligomer molecule, thereby enabling the polyol to take part in urethane synthesis.

Many urethane-acrylate oligomers used in formulations for optical fibre coatings are based on polyether diols such as poly(ethylene glycol), poly(propylene glycol) and poly(tetrahydrofuran) diols. These materials have found application particularly in primary coatings, since they contribute to a low Tg and have good hydrolytic stability. However, the polyether backbone is very sensitive to oxidation and tends to incur high water adsorption. We have found that on ageing at elevated temperatures (e.g. 100° C. or 125° C.) film coatings made from polyether urethane-acrylates show very marked changes in modulus in very short time periods. Primary coatings tend to show a very rapid drop in modulus over the first few days, accompanied by discoloration and contraction of the samples. Over longer timer periods the modulus often rises again and can reach quite high levels after prolonged ageing. Use of antioxidants can slow down or delay the disintegration but large changes in properties are eventually seen. We have also found that secondary coatings based on polyether urethane-acrylate oligomers often show large and rapid increases in room temperature modulus at these temperatures.

Another class of oligomer polyols which are useful in the synthesis of urethane-acrylate oligomers to be used for formulations for optical fibre coating are the polyester polyols, particularly polyester diols. As is well known, polyesters, which contain carbonyloxy linking groups (i.e. ester groups of formula —C(=O)—O—), are made by polymerising an "acid-component", by which we mean a component consisting of reactant(s) based substantially on at least one multifunctional carboxylic acid (usually mostly or all dicarboxylic), or ester-forming derivatives thereof such as acid halides, anhydrides or esters (polymerisation taking place by transesterification in the latter case) and a "hydroxyl-component", by which we mean a component consisting of reactant(s) based substantially on at least one polyol (usually mostly or all diol). (It is to be understood however, that the polyester may contain if desired small amounts of carbonylamido linking groups —C(=O)—NH— by including a minor amounts of an appropriate amino functional reactant as part of the "hydroxyl-component"; however this is not usual). Polyester polyols therefore have the advantage that they are readily synthesised by a facile process using a range of readily-available inexpensive starting materials, e.g. multifunctional carboxylic acids or esters (usually predominantly difunctional) and multifunctional alcohols (usually mainly diols). Use of a suitable stoichiometric excess of the polyol (diol) renders the polyester hydroxyl-ended and so readily suitable for urethane synthesis. Most polyesters are inherently much more thermally stable and resistant to oxidation than polyethers. The problems encountered in using most polyesters in these urethane-acrylate formulations are: hydrolytic instability; achieving a sufficiently low Tg for a primary coating; and the tendency of many polyesters to crystallise leading to changes in modulus and other properties.

We have now found that urethane-acrylate oligomers made using polyester polyols (usually polyester diols) which comprise dimer acid residues in their structure are very suitable components of radiation-curable formulations (compositions) employed for preparing optical fibre coatings since problems of the type mentioned supra when employing polyester polyols can be avoided by their use. Such formulations are useful not only for providing primary coating materials for optical fibres but are also useful in the production of secondary coating materials, in which category we also include ribbon materials(this term will be explained hereinafter) for optical fibres which are often of a very similar nature to secondary coatings.

Therefore, according to the present invention there is provided the use of an ethylenically-terminated urethane oligomer, preferably a urethane-acrylate oligomer, for the provision of a radiation-cured coating material of an optical fibre, said urethane oligomer being derived from reactants which include a hydroxyl-terminated polyester polyol which has been made by polymerising an acid-component and a hydroxyl-component and which has dimer acid residues in its structure, wherein said dimer acid residues are residues derived from the use of a dimer acid as at least part of the acid-component and/or by the use of the diol derivative of a dimer acid as at least part of the hydroxyl component.

There is also provided according to the invention a coated optical fibre having at least one coating of a radiation-cured coating material which has been formed by radiation-curing a radiation curable coating composition which comprises a urethane oligomer as defined supra.

There is further provided according to the invention a method for the production of a coated optical fibre, which method comprises applying a radiation-curable coating composition to an optical fibre, which may already have one or more coatings, and radiation-curing the coating composition, and wherein said radiation-curable composition comprises a urethane oligomer as defined supra.

It will be perceived that dimer acid residues can be incorporated into the structure of the hydroxyl-terminated polyester polyol in three alternative techniques as follows:

A the acid component residue of said polyester polyol has been derived at least in part from a dimer acid, and the hydroxyl-component residue contains no dimer-acid residues, or B the hydroxyl-component residue of said polyester polyol has been derived at least in part from a diol derivative of a dimer acid, and the acid-component residue contains no dimer acid residues, or C both the acid-and hydroxyl-component residues of the polyester polyol are comprised at least in part of dimer acid residues, the acid-component dimer acid residue being derived from a dimer acid, and the hydroxyl-component dimer acid residue being derived from the diol derivative of a dimer acid.

By a hydroxyl-terminated polyester polyol is meant a polyester having at least two hydroxyl groups per molecule (usually 2 to 4 hydroxyl groups per molecule) and having each end of polyester molecules thereof terminated with hydroxyl groups. When the polyester polyol has 2 hydroxyl groups per molecule (both at the ends) (as is quite usual but not exclusive in the present invention) it may be thought of as a hydroxyl-terminated polyester diol.

The ethylenically-terminated urethane oligomer is a urethane oligomer whose molecules have a terminal ethylenically unsaturated bond at or near each end thereof; preferably the material is a urethane-acrylate oligomer so that the two terminal ethylenic bonds are incorporated as part of (meth)acryloyl groups. (Urethane-acrylates, as mentioned earlier, are a well-known group of urethane oligomers which have been widely used in the optical fibre coating art). Such oligomers are very commonly made from reactants which include a hydroxyl-terminated polyol (in the present invention this will be a hydroxyl-terminated polyester polyol as defined), an organic polyisocyanate (usually a diisocyanate) and a hydroxyl-functional (usually monohydroxyl) ethylenically unsaturated monomer, the ratio of NCO groups in the polyisocyanate to OH groups in the polyol usually being greater than 1:1 and the ratio of total OH groups to NCO groups usually being at least 1:1.

As examples of organic polyisocyanates which may be used in the above-described method for making urethane-acrylates (using this term for convenience to represent diethylenically terminated urethane oligomers in general as mentioned supra) one may mention isophorone diisocyanate (IPDI), toluene diisocyanate (TDI)

diphenylmethane diisocyanate MDI, and tetramethylxylene diisocyanate (TMXDI). Where such compounds can exist as isomers, the individual isomers may be employed or (more usually) an isomeric mixture can be used. Examples of hydroxy-functional ethylenically unsaturated monomers particularly include hydroxy-functional (meth) acrylate esters such as hydroxyalkyl (meth)acrylates of 1 to 5 (usually 1 to 3) carbon atoms in the alkyl group. Examples of these materials include 2-hydroxyethyl acrylate, 2-hydroxyethyl methacrylate, 2-hydroxypropyl acrylate, 3-hydroxypropyl acrylate, 2-hydroxypropyl methacrylate, and 3-hydroxypropyl methacrylate; adducts of these materials which retain the hydroxyl and (meth)acrylate functionalities may also be used—for example adducts of the preceding hydroxyalkyl (meth)acrylates with caprolactone (e.g. "Tone" M-100 from Union Carbide Corporation).

In the synthesis of the urethane-acrylates using such a method, various orders of addition of the reactants can be used. For example about one mole of hydroxyl-terminated polyester polyol can be added to about two moles of the polyisocyanate (usually diisocyanate) to make an isocyanate-terminated preoligomer which is then reacted with about two moles of the hydroxy-functional ethylenically unsaturated monomer (usually hydroxy-functional (meth)acrylate ester as discussed supra) to yield the urethane-acrylate oligomer. (It is to be understood that the reference to "moles" is intended to convey the relative proportions of the reactants, and of course any multiple or fraction of molar quantities may be used in similar proportion.) Alternatively about two moles of the hydroxy-functional ethylenically unsaturated monomer may be reacted with about two moles of the polyisocyanate to make an unsaturated isocyanate adduct, and then about one mole of the polyester diol added to react with the remaining isocyanate groups. Chain-extended urethane-acrylate oligomers, (i.e. where there is more than one polyester polyol unit per molecule), which are likewise intended to be within the scope of the urethane oligomers used in the invention, can also be made using this method when using polyisocyanates, by employing in the urethane-acrylate synthesis a simple low molecular weight di NCO-reactive group-functional compound (such as 1,4-butane diol or ethylene diamine) or an oligomeric di NCO-reactive group-functional compound such as a polyol oligomer or amine-terminated oligomer (e.g. by reaction of such a compound with an NCO-terminated preoligomer which includes a unit derived from the polyester polyol, thereby to provide a chain-extended NCO-terminated preoligomer).

The urethane-acrylates used in the invention may be made using methods other than that discussed supra (which is based essentially on reacting polyol, polyisocyanate and hydroxy-functional ethylenically unsaturated monomer). For example, they may be prepared by reacting about one mole of the polyester polyol with about 2 moles of an ethylenically unsaturated monoisocyanate, examples of which include isocyanatoethyl (meth)acrylate.

The reaction to form the urethane-acrylate can be catalysed by e.g. amines or tin salts (e.g. dibutyl tin dilaurate) and can be carried out with the reactants neat or dissolved in a volatile solvent and/or an ethylenically unsaturated liquid solvent which will ultimately act as a copolymerisable (reactive) diluent when the urethane-acrylate is used in a coating formulation and radiation-cured. The reaction is typically carried out it between 40° to 90° C., often with stabilisers present to prevent premature polymerisation of the ethylenically unsaturated reactive liquid diluent (if present) during the synthesis or during storage of the liquid oligomer.

The number average molecular weight of the urethane-acrylate oligomer will often be within the range of from 1000 to 6000, more usually from 1500 to 4000.

The hydroxyl-terminated polyester polyol reactant used in the production of the urethane oligomer is now discussed in more detail.

As defined supra, the acid-component and/or hydroxyl component residues of the polyester polyol are at least partially comprised of dimer acid residues, in the case of the acid-component being derived from a dimer acid and in the case of the hydroxyl component being derived from the diol derivative of a dimer acid (hereinafter a "dimer diol" for convenience).

Dimer acids (and esters thereof) are a well known commercially available class of dicarboxylic acids (or esters). They are normally prepared by dimerising unsaturated long chain aliphatic monocarboxylic acids, usually of 13 to 22 carbon atoms, or their esters (e.g. alkyl esters). The dimerisation is thought by those in the art (although we should not be bound by this) to proceed by possible mechanisms which includes Diels Alder, free radical, and carbonium ion mechanisms. The dimer acid material will usually contain 26 to 44 carbon atoms. Particularly, examples include dimer acids (or esters) derived from C-18 and C-22 unsaturated monocarboxylic acids (or esters) which will yield, respectively, C-36 and C-44 dimer acids (or esters). Dimer acids derived from C-18 unsaturated acids, which include acids such as linoleic and linolenic are particularly well known (yielding C-36 dimer acids). For example Δ9, 11 and Δ9, 12 linoleic acids can dimerise to a cyclic unsaturated structure (although this is only one possible structure; other structures, including acyclic structures are also possible). The dimer acid products will normally also contain a proportions of trimer acids (e.g. C-54 acids when using C-18 starting acids), possibly even higher oligomers and also small amounts of the monomer acids. Several different grades of dimer acids are available from commercial sources and these differ from each other primarily in the amount of monobasic and trimer acid fractions and the degree of unsaturation.

Usually the dimer acid (or ester) products as initially formed are unsaturated which could possibly be detrimental to their oxidative stability by providing sites for crosslinking or degradation, and so resulting in changes in the physical properties of the coating films with time. It is therefore preferable (although not essential) to use dimer acid products which have been hydrogenated to remove a substantial proportion of the unreacted double bonds.

Herein the term "dimer acid" is used to collectively convey both the diacid material itself, or ester-forming derivatives thereof (such as lower alky esters) which would act as an acid component in polyester synthesis and includes (if present) any trimer or monomer.

A diol derivative of a dimer acid (a "dimer diol") can e.g. be made by reduction of the carboxyl groups of a dimer acid (i.e. each carboxyl functionality is chemically transformed into a hydroxyl group). (A dimer diol could also conceivably be made by first converting the carboxyl groups of a long chain aliphatic acid to hydroxyl groups and then performing the dimerisation process).

The amount of dimer acid residues to incorporate in the polyester polyol will depend on the desired nature and properties of the resulting polyester polyol in relation to the resulting urethane-acrylate and its intended application (e.g. whether it is to be used in a formulation for a primary or secondary/ribbon coating). Generally speaking, however, the amount of dimer acid residues incorporated will correspond to a level of dimer acid-based reactants (by which we mean the dimer acid and/or dimer diol reactants used in the polyester synthesis) which is within the range of from 30 to 100 weight more usually between 50 to 90 weight %, based on the total of acid- and hydroxyl-component reactants employed in the polyester polyol synthesis.

In the synthesis of the polyester polyol using alternative A, the acid component used therefor can consist solely of dimer acid, i.e. the dimer acid can be the only acid in the acid-component. Alternatively, the dimer acid may be used in conjunction with (i.e. copolymerised with) any one or more non-dimer diacids or higher functionality acids (or their ester-forming derivatives) which are known to be useful in the synthesis of polyesters. Suitable acids for this purpose include C-4 to C-20 aliphatic, alicyclic and aromatic dicarboxylic acids (or higher functionality acids) or their ester-forming derivatives (such as anhydrides or lower alkyl esters). Specific examples include adipic acid, fumaric acid, maleic acid, succinic acid, itaconic acid, sebacic acid, 1,4-cyclohexanedicarboxylic acid, 1,3-cyclohexanedicarboxylic acid, 1,2-cyclohexanedicarboxylic acid, terephthalic acid, isophthalic acid, phthalic acid, and tetrahydrophthalic acid. Anhydrides include succinic, maleic and phthalic anhydrides.

With regard to the hydroxyl-component reactants used in the polyester polyol synthesis in alternative A, these can be any one or more of the non dimer diols (glycols) known to be useful for polyester synthesis and may be aliphatic, aryl or aralkyl glycols; small amounts of higher functionality alcohols may also be used if desired (e.g. tri- or tetrafunctional alcohols). Examples of these include 1,6-hexane diol, ethylene or propylene glycol, 1,4-butanediol, neopentyl glycol, the 1,2-,1,3-, and 1,4- cyclohexanediols and the corresponding cyclohexane dimethanols, diethylene glycol, dipropylene glycol, glycerol, trimethylol propane, and pentaerythritol. Diols such as alkoxylated bisphenol A products (which are here intended to be included within the term aralkyl glycols), e.g. ethoxylated or propoxylated bisphenol A could also be used if a rather higher Tg urethane-acrylate based coating material is required (see later).

In the synthesis of the polyester polyol when using alternative B, the hydroxyl-component can consist solely of dimer diol, i.e. the dimer diol can be the only hydroxyl-component reactant. Alternatively the dimer diol may be used in conjunction with (i.e. copolymerised with) any one or more of the non dimer diols (or higher functionality alcohols) known to be useful for polyester synthesis, examples of which are those given above when discussing the hydroxyl-component reactants used in alternative A.

With regard to the acid-component reactants used in the polyester polyol synthesis (in alternative B) these can be any one or more of the non dimer diacids or higher functionality acids which are known to be useful in the synthesis of polyesters, examples of which can be those given above when discussing the acid-component reactants used in alternative A.

In the synthesis of the polyester polyol when using alternative C, the acid-component can consist solely of dimer acid or alternatively (and more usually) it can be used in conjunction with one or more of the (non dimer) acid components known to be useful in polyester synthesis examples of which are given above when discussing the acid-component reactants in alternative A, while the hydroxyl component used therefor can consist solely of dimer diol or (more usually) it can be used in conjunction with one or more other (non dimer) diols (or higher functionality alcohols) known to be useful in polyester synthesis, examples of which are given above when discussing the hydroxyl component reactants used in alternative A.

The relative levels of the acid-component reactants and hydroxyl-component reactants should be such, as mentioned supra, that the resulting polyester polyol is hydroxyl-terminated. Therefore a suitable stoichiometric excess of hydroxyl-components will be employed. Generally speaking the reactants are usually used in proportions such that the ratio of hydroxyl-component hydroxyl groups to acid-component carboxyl groups is from about 1.05:1 to about 1.5:1 (more usually 1.3:1 to 1.1:1).

The number average molecular weight of the polyester polyol will often be in the range of from 500 to 5000, more usually from 1000 to 3000.

It is found that use of the urethane oligomers as defined above allows the production of optical fibre coating materials having an excellent balance of properties appropriate for any type of optical fibre coating material, such as hydrophobicity, good resistance to oxidation and hydrolysis (particularly over extended time periods) and very little tendency to crystallise, and also allow a high degree of flexibility in adjusting particular desired properties apposite to a specific type of coating material, e.g. a primary or secondary/ribbon coating material, such as mechanical properties (e.g. softness or hardness, modulus) and Tg.

It may be mentioned here that radiation-curable compositions based on dimer acid residue polyester urethane-acrylates (the polyester polyol being made using alternative A) are themselves known to the art. For example, U.S. Pat. No. 4,164,486 and Japanese Publication 58-02981 (both to Dainippon Ink) disclose such cured compositions which are said to have as their main advantage, besides good curability and good chemical and physical properties, excellent adhesion to metal substrates. However it had not before been realised that dimer acid residue polyester urethane-acrylate oligomers could be so advantageously used for the production of optical fibre coating materials wherein they contribute to such an excellent overall balance of properties apposite to such coatings. In particular, it had not hitherto been realised that their use could solve a problem that arises when using polyester polyols, as components of urethane-acrylate oligomers, in the production of such coating materials, as discussed supra.

When employed for the production of a radiation-cured coating of an optical fibre, a urethane-acrylate oligomer is normally cured as part of a radiation-curable coating composition in conjunction with at least an ethylenically unsaturated monomer which is a liquid solvent for the oligomer and is copolymerisable therewith, often termed a reactive diluent as mentioned above (more than one urethane-acrylate and/or ethylenically unsaturated monomer may of course be used in the composition). The presence of the ethylenically unsaturated liquid monomer(s), usually a monoethylenically unsaturated material(s), allows one to achieve acceptable viscosity for the coating composition, to achieve a more rapid cure response, and assists in achieving (as appropriate) important physical properties of the cured coating material required for the specific coating being made, such as modulus and Tg.

The relative proportions of the urethane-acrylate component and the monoethylenically unsaturated monomer component will depend to some extent on the required properties of the cured coating product; however typical compositions contain 30 to 85 parts by weight (more usually 40 to 80 parts by weight) of the urethane-acrylate component based on 100 parts of the urethane-acrylate component plus the monoethylenically unsaturated monomer component, and correspondingly 70 to 15 parts by weight of the monoethylenically unsaturated monomer component (more usually 60 to 20 parts by weight).

In some compositions for use in the invention, it may be possible to do without the use of a monoethylenically unsaturated monomer component, using e.g. the urethane-acrylate oligomer component in conjunction with a multiethylenically unsaturated monomer (these materials are discussed later in this specification) as the only other unsaturated coreactant.

Radiation-curing will, in the majority of cases, be effected by ultra-violet or visible radiation, in which case the radiation-curable composition will include a photoinitiator or photo initiator composition. (It is nevertheless possible to effect radiation-curing using radiation other than ultra-violet or visible radiation, for example using electron beam radiation; in the latter case a photoinitiator system would not be essential in the composition.) A photoinitiator composition may comprise, as the radiation-absorbing component thereof, conventional agents such as benzophenone and derivatives thereof, acetophenone and derivates thereof, benzoin, benzoin alkyl ethers, benzil, acyl phosphine oxide compounds (such as Lucirin TPO) and benzil acetal or ketal compounds (such as Irgacure 651). The photoinitiators may be used singly or in mixtures and used) are present usually in amounts up to about 10% of the coating composition on a weight basis (i.e. 0 to 10% by weight or 0.1 to 10% by weight if present, especially (if present) from 2 to 6%). Accelerators, such as amine accelerators like methyldiethanolamine or diethylaminoethyl benzoate, may be included if desired to enhance the cure rate.

The radiation-curable coating may optionally also include small amounts (0 to 25% by weight of the composition) of multiethylenically unsaturated monomers such as hexane diol diacrylate or dimethacrylate, tripropleneglycol diacrylate or dimethacrylate, ethylene glycol diacrylate or dimethacrylate, trimethylolpropane triacrylate or trimethacrylate, or trimethylolpropane ethoxylate triacrylate or trimethacrylate, in order to control the crosslink density and further control the coating modulus. (Primary coatings will usually incorporate 0 to 10% by weight of such monomers, while secondary or ribbon coatings will usually incorporate 0 to 25% by weight).

The coating composition may also contain other ingredients. For example, stabilisers such as hindered phenols, or amines or phenothiazine may be present to improve shelf-stability (preventing premature polymerisation). Surfactants may be present to control the surface tension. A coupling agent, such as an alkoxysilane may also be present to increase glass adhesion (usually up to about 5 wt % of the coating composition). Other ingredients could include flatting agents, slip agents, pigments or dyes.

The components of the coating composition (particularly with regard to the urethane-acrylate and monoethylenically unsaturated monomer components) will normally be selected to suit the particular type of coating that is to be formed therefrom, e.g. a primary or a secondary coating or ribbon coating, and in all cases the dimer acid-residue polyester urethane-acylate used therein will contribute to an excellent balance of properties.

In the case of primary coatings, the desire is to acheive, inter alia, low Tg and low modulus (as discussed supra). We have found in such cases that use of the dimer acid-residue polyester urethane-acrylate oligomers in the formation thereof (according to the invention) results in film coatings which are very suitable as primary coatings. In such cases, speaking e.g. in terms of using alternative A, the acid-component residue of the polyester polyol employed in the urethane-acylate formation is often derived entirely from dimer acid (particularly in hydrogenated form). The hydroxyl component residue of the polyester polyol is preferably derived from aliphatic (or alicylic) diols such as 1,6-hexane diol, ethylene or propylene glycol, 1,4-butane diol, neopentyl glycol, (cyclohexane diols, and cyclohexanedimethanols). Aralkyl glycols such as alkoxylated bisphenol A products (and also alicyclic diols, unless having long chains) should usually be avoided for primary coatings since they tend to increase the resulting Tg and modulus too much. Furthermore, the monoethylenically unsaturated monomer component (reactive diluent) in the coating compositions will be desirably selected from low Tg materials (i.e. materials which when homopolymerised have a low Tg). Examples of these include aliphatic acrylates such as lauryl, octyl, decyl, and isodecyl acrylates and acrylates made from ethoxylated or proxylated phenols or alkyl substituted phenols. In the latter category are included phenol tetra-ethoxylate and propoxylate acrylates, nonylphenol ethoxylate acrylate and phenoxyethylacrylate. Other low Tg reactive diluents such as ethoxyethoxyethyl acrylate could also be used. Mixtures of diluents can of course be used.

Such coating compositons suitable for making primary coating materials (as discussed surpa) yield film coatings of excellent hydrolytic and oxidative stability, low Tg and very low water absorption—all these desirable properties being contributed to significantly by the presence of the defined dimer acid-residue polyester urethane-acrylate. The polyesters are flexible (giving low Tg) and hydrophobic (giving low water adsorption). In addition they exhibit good hydrolytic stability and have very little tendancy to crystallise. These materials therefore overcome the normal shortcomings of polyester polycols as components of urethane-acrylate oligomers in optical-fibre coatings, and in addition contribute to excellent thermal stability and low water absorption.

The primary coating preferably has a Tg of below −20° C., more preferably below −40° C. However, primary coatings can in some cases have Tg's up to and greater than 20° C. A broad range for the Tg of the primary coating is −60° C. to 30° C. Such Tg values are conveniently measured by thermomechanical analysis, or differential scanning calorimetry. The coating preferably has a tensile modulus (at 25° C.) of below 4 MPa, preferably below 2.5 MPa. A typical range is from 1 to 4 MPa, more usually from 1.5 to 3.5 MPa.

With regard to secondary coatings, and certain ribbon coatings the desire is to achieve, inter alia, high Tg and high modulus (as discussed supra). (Ribbon coatings are coatings which hold together a plurality of adjacent already-coated optical fibres. They can be of the "encapsulating" type, wherein the coated fibres are completely encapulated in the ribbon coating, or they can be of the "edge-bonding" type in which the coating does not completely encapsulate the coated fibres but bonds them together at their adjacent surfaces). We have, again, found that use of the dimer acid residue polyester urethane-acrylate oligomers in the formulations therefor results in coatings which are very suitable for such applications provided one uses appropriate formulation techniques. Thus it is possible here to use a dimer acid-residue polyester urethane-acrylate oligomer as discussed above (i.e. suitable for primary coatings) in combination with a second (non dimer acid residue-containing) urethane-acrylate oligomer which will impart the higher modulus and Tg required; in such cases the dimer acid-residue polyester urethane-acrylate oligomer will again be useful in advantageously achieving an excellent balance of appropriate properties. For example, the modulus of the coating can be controlled by blending the two oligomers in different ratios (e.g. 90/10 to 10/90 on a weight to weight basis). (It may also be possible to use a dimer acid residue polyester urethane-acrylate oligomer without a non-dimer acid-residue urethane-acrylate oligomer being present if the hydroxyl-component residue of the former is based on an aralkyl glycol such as an alkoxylated bisphenol A). The presence of the dimer acid-residue polyester urethane-acylate oligomer, as in primary coatings, will contribute to low water absorption, excellent hydrolytic and thermal (oxidative) stability, and non-tendency to crystallise. We have found that non-dimer acid-residue urethane acrylate oligomers which are very suitable second oligomers are those in which the polyol used in the urethane-acrylate synthesis is ethoxylated or propoxylated bisphenol A, where the degree of alkoxylation of the bisphenol A unit is about 2 to 12.

In the case of secondary coatings or encapsulating ribbons the monoethylenically unsaturated monomer component in the coating compositions therefor will be desirably selected from high Tg materials. Examples of these include isobornyl and dicyclopentadienyl acrylates and methacrylates, N-vinylpyrrolidone and N-vinyl caprolactam. Mixtures of reactive diluents can of course be used.

It may also be mentioned that some secondary coatings may be derived from compositions in which the urethane-acrylate oligomer is used in conjunction only with a multiethylenically unsaturated component i.e. no monoethylenically unsaturated monomer component being present.

The secondary coating material (or analogous encapsulating ribbon coating material) preferably has a Tg of above 20° C., more usually above 30° C. A typical range is 20° to 100° C., more usually 30° to 60° C. Such a coating preferably has a tensile modulus (at 25° C.) of above 500 MPa, preferably above 700 MPa. A typical range is from 650 to 1600 MPa, more usually from 700 to 1100 MPa.

With regard to edge-bonding ribbon coatings, these materials usually have (like a primary coating) a low Tg (preferably < −40° C.), but normally have a somewhat higher modulus.

The radiation-curable coating composition can be applied to the optical fibre(s), which may of course already be precoated, by any convenient or conventional method. Usually a fibre, or a plurality or bundle of fibres, is drawn through a bath containing the coating composition at an appropriate rate (e.g. about 1 to about 10 meters per sec) to give a liquid coating, usually of thickness between about 25 and 300 microns. Finally, the coating composition is subjected to radiation to cure the coating.

The present invention is now illustrated by reference to the following examples. Unless specified otherwise all parts, percentages and ratios are on a weight basis.

In these examples, various dimer acid-residue polyester urethane-acrylate oligomers are synthesised, in the presence of a reactive diluent (to be employed in a subsequent formulation), and subsequently formulated into compositions (i.e. formulations) suitable for primary and secondary (or encapsulating ribbon) coating materials.

In the examples, viscosities were measured using a Brookfield viscometer. Also, rather than measuring the properties of the cured coating composition (formulations) while coated on the optical fibres themselves, films of 125 microns were coated onto metal or glass panels and fully cured by passing under a Fusions Systems uv lamp arrangement (comprising a high intensity UV lamp, about 300 watts/inch, with a belt passing underneath; the belt speed is controllable to alter the UV dose per pass) using a D bulb (this being a particular type of UV bulb with a defined spectral output), the dose required to achieve full cure having been previously determined by plotting a graph of film modulus as a function of cure dose. (It is more convenient to measure the properties of the cured coating materials in this manner.) Tensile modulus measurements were made using an Instron testing machine. A Polymer Laboratories DMTA in tensile mode at 1 Hz was used to obtain tan delta (max) data, which is related to Tg but is dependent on the frequency used (here 1 Hz). Tg's were measured using thermomechanical analysis. Water properties were measured by first dessicating a film for 48 h and weighing (W1), soaking in water for 24 h and reweighing (W2), and finally redessicating for 48 h and taking a final weight (W3). The percentage uptake is defined as 100(W2-W1)/W1; the absorption as 100(W2-W3)/W1; and the extractables as 100(W1-W3)/W1.

In the synthesis of the urethane-acrylate oligomers, various hydroxyl-terminated dimer acid-residue polyester diols were used as follows (the dimer acid being in hydrogenated form in each case):

PE 1=dimer acid/adipic acid/hexanediol polyester, mwt 2000 (made using approx 60% dimer acid based on the total of acid and hydroxyl reactants).

PE 2=dimer acid/ethylene glycol polyester, mwt 2000 (made using approx 88% dimer acid based on the total of acid and hydroxyl reactants).

PE 3=dimer acid/hexanediol polyester, mwt 2000 (made using approx 78% dimer acid based on the total of acid and hydroxyl reactants).

PE 4=dimer acid/hexanediol polyester, mwt 3000 (made using approx 80% dimer acid based on the total of acid and hydroxyl reactants).

Also in the examples, various reactive diluents are used, including the following:

Diluent 1 is phenol tetrapropoxylate acrylate

Diluent 2 is trimethylolpropane ethoxylate triacrylate.
Photomer 4039 is a monofunctional aromatic acrylate from Harcros.
Photomer 7031 is a monofunctional aromatic acrylate monomer from Harcros.

Also, the following photoinitiators and stabilisers are used: Irgacure 651 is a photoinitiator purchased from Ciba-Geigy and ICI, respectively. Lucirin TPO is a photoinitiator purchased from BASF. Irganox 1010 and Topanol "O" are stabilisers purchased from Ciba-Geigy. DC 190 and DC 57 are surfactants purchased from Dow Corning. The words Irgacure, Lucirin, Photomer, Irganox, Ukanil, and Topanol used in the examples are believed to be registered trade marks in one or more countries.

Example 1

In this example radiation-curable coating compositions suitable for primary optical fibre coatings are prepared, cured, and tested.

Preparation of Dimer Acid-Residue Polyester Urethane-Acrylate Oligomers (U/A's 1 to 4)

Oligomer U/A1 was prepared as follows. Isophorone di-isocyanate (111.2 g), Topanol "O" (0.67 g), di-n-butyltin dilaurate (1.11 g) and Photomer 4039 (273.9 g) were charged to a reaction vessel and warmed to 40° C. with stirring. The polyester PE 1 (500 g) was warmed to about 40° C. and added to the above stirred solution over 2.5 h, keeping the temperature at 40°–45° C. After stirring the mixture at this temperature for a further 1 h, 2-hydroxyethyl acrylate (58.1 g) was added dropwise over 15 mins. The solution was then stirred at this temperature until the isocyanate level, as measured by infra red or by titration, was down to an acceptable level.

Oligomers U/A2,3 and 4 were similarly prepared using polyester diols PE2, PE3, and PE4 respectively.

Preparation of Coating Formulations (No's 1 to 6) and Testing of Cured Coatings therefrom Formulation 2 was prepared as follows. Oligomer U/A1 solution, prepared as described above (70.4 g), was mixed with extra Photomer 4039 (9.6 g), Photomer 7031 (15.0 g), trimethylolpropane ethoxylate acrylate (2.0g) and Irgacure 651 (3.0g) to give a solution with a viscosity of 49 Poise at 30° C. Cured films gave the following water properties: uptake=1.2%, absorption=1.6%, extractables=0.4%. Thermomechanical anlaysis (TMA) gave a Tg (break in the slope of linear coeffient of expansion plot) of −35° C.

The Table 1 below gives details of formulations 1,3,4,5,6 as well as 2, all these formulations being suitable for primary coatings. The percentages of oligomers in the Table refer to the neat oligomer (i.e. excluding diluent). Stabilisers and surfactants are not included in Table 1. The results of Tensile testing and water properties of the cured film coatings are also given in Table 1.

TABLE 1

|  | Formulation: | | | | | |
| --- | --- | --- | --- | --- | --- | --- |
|  | 1 | 2 | 3 | 4 | 5 | 6 |
| U/A1 |  | 50 |  |  |  |  |
| U/A2 |  |  | 54.5 |  |  |  |
| U/A3 | 50 |  |  |  | 53 |  |
| U/A4 |  |  |  | 48 |  | 61 |
| Photomer 4039 |  | 30 |  |  |  |  |
| Photomer 7031 | 45 | 15 | 40 |  |  |  |
| Isodecyl acrylate |  |  |  |  |  | 32 |
| Diluent 1 |  |  |  | 46 | 44 |  |
| Diluent 2 | 2 | 2 | 2.5 | 3 |  | 4 |

TABLE 1-continued

|  | Formulation: | | | | | |
| --- | --- | --- | --- | --- | --- | --- |
|  | 1 | 2 | 3 | 4 | 5 | 6 |
| Irgacure 651 | 3 | 3 | 3 | 3 | 3 |  |
| Lucirin TPO |  |  |  |  |  | 3 |
| Viscosity (Poise) | | | | | | |
| 30° C. | 50 | 49 | 48 |  |  |  |
| 40° C. |  |  |  | 19 | 21 |  |
| Tensile Modulus (MPa at 25° C.) | 2.5 | 2.5 |  | 1.5 | 1.5 | 2.2 |
| Water Uptake (%) | 0.3 | 1.2 | 0.2 | 1.2 | 0.4 | 0.4 |
| Water Absorption (%) | 0.5 | 1.6 | 0.4 | 1.6 | 0.9 | 0.4 |
| Water Extractables (%) | 0.2 | 0.4 | 0.2 | 0.4 | 0.5 | <0.1 |

Thermal stability data were obtained for Formulations 1 and 6. Films of 125 μm were aged in air at 100° C. and 125° C. for one month and the tensile modulus at 25° C. periodically measured. The results are shown in the following Table 2.

TABLE 2

|  | Formulation 1 | | Formulation 6 | |
| --- | --- | --- | --- | --- |
|  | 100° C. | 125° C. | 100° C. | 125° C. |
| No. days aged | Tensile Modulus (MPa) | | | |
| 0 | 2.5 | 2.5 | 2.2 | 2.2 |
| 1 |  |  | 1.9 | 1.8 |
| 2 | 2.5 | 2.4 |  |  |
| 3 |  |  | 1.9 | 1.8 |
| 6 | 2.4 | 2.6 |  |  |
| 7 |  |  | 1.7 | 1.6 |
| 13 | 2.5 | 2.7 |  |  |
| 14 |  |  | 1.7 | 2.1 |
| 30 | 2.4 | 2.8 |  |  |

Hydrolytic stability data were obtained for Formulations 1,4,5 and 6; these are shown in the following Table 3.

TABLE 3

| Formulation No. | Water Temp. (°C.) | No. Days aged | Tensile Modulus (MPa) |
| --- | --- | --- | --- |
| 1 | 80 | 0 | 2.5 |
|  |  | 14 | 2.3 |
| 4 | 80 | 0 | 1.5 |
|  |  | 7 | 1.6 |
|  |  | 10 | 1.5 |
| 5 | 80 | 0 | 1.5 |
|  |  | 7 | 1.3 |
| 6 | 60 | 0 | 1.9 |
|  |  | 7 | 2.0 |
|  |  | 14 | 2.0 |
|  |  | 42 | 1.6 |
|  |  | 56 | 1.5 |

(accuracy of measurement approximately ±0.1–0.2 MPa)

Example 2

In this example, radiation-curable compositions suitable for optical fibre secondary coatings (and encapsulating ribbon coatings) are prepared, cured, and tested.

Preparation of Dimer Acid-Residue Polyester Urethane-Acrylate Oligomer (U/A5)

Oligomer U/A5 was prepared as follows. Isophorone di-isocyanate (222.2 g), Irganox 1010 (Ciba-Geigy, 1.74 g), di-n-butyltin dilaurate (2.2 g) and isobornyl acrylate (Sartomer 506, 201.0 g) were charged to a reaction vessel and warmed to 45° C. while stirring. 2-Hydroxyethyl acrylate (116.1 g) was then added over 2 h. When addition was complete, extra isobornyl acrylate (200 g) was added and the temperature raised to 50°–55° C. and held for 30 mins. The polyester PE 1 (1000 g) was warmed 50° C. and added to the vessel over 2 h.

The temperature of 50°–55° C. was maintained until the NCO level as determined by infra red or isocyanate titration, had fallen to an acceptable level. Phenothiazine (0.35 g) was added, and then the resin was cooled. The viscosity of the oligomer solution was 230 Poise at 30° C.

Preparations of Non-Dimer Acid-Residue Polyester Urethane-Acrylate Oligomers
(U/A's 6 and 7)

Oligomer U/A 6 was prepared as follows. Isophorone di-isocyanate (444.4 g), Irganox 1010 (0.91 g), di-n-butyltin dilaurate (4.44 g) and isobornyl acrylate (290.5 g) were charged to a rection vessel and warmed to 50° C. while stirring. 2-Hydroxyethyl acrylate (232.0 g) was then added over 2 h. When addition was complete the temperature was raised to 50°–55° C., held for 1 h, and further isobornyl acrylate (290.5 g) added. Bisphenol A hexapropoxylate (Ukanil 8306 from ICI, 576.0 g) was added to the reaction vessel over a period of 2 h. The temperature of 50°–55° C. was maintained until the isocyanate level had fallen to an acceptable value. Phenothiazine (0.36 g) was then added and the mixture was cooled. The viscosity at 30° C. was 316 Poise.

Oligomer U/A 7 was similarly prepared using bisphenol A tetrapropoxylate.

Preparation of Coating Formulations (Nos.7 to 11) and Testing of Cured Coatings therefrom Formulation 10 was prepared as follows. Oligomer U/A 5 solution, prepared as described above (26.8 parts) and Oligomer U/A 6 solution, also prepared as described above (46.9 parts) were blended with isobornyl acrylate (13.1 parts), ethoxylated trimethylolpropane triacrylate (10.0 parts), Lucirin TPO (BASF, 3 parts), and Irganox 1010 (0.02 parts). The mixture was stirred until a clear homogeneous solution resulted which has a viscosity of 18 Poise at 40° C.

The cured film showed: Tensile modulus=1100MPa; tan delta (max) at 1 Hz at 78° C.; water uptake=1.0%, water absorption=1.1%, water extractables=0.1%.

The Table 4 below gives details of formulations 7,8,9,11 as well as 10, all these formulations being suitable for secondary coatings and ribbon resins. The percentages of the oligmers given in Table 4 refer to those of the neat oligomers (i.e. excluding diluent).

TABLE 4

| | Formulation No: | | | | |
|---|---|---|---|---|---|
| | 7 | 8 | 9 | 10 | 11 |
| U/A5 | 26.0 | 30.0 | 33.0 | 20.6 | 10.4 |
| U/A7 | 25.0 | 22.0 | 19.0 | | |
| U/A6 | | | | 32.2 | 41.4 |
| Isobornyl acrylate | 30.5 | 29.5 | 29.5 | 34.1 | 35.1 |
| Ethoxylated TMPTA* | 15.0 | 15.0 | | 10.0 | 10.0 |
| TMPTA* | | | 15.0 | | |
| Lucirin TPO | 3.0 | 3.0 | 3.0 | 3.0 | 3.0 |
| Irganox 1010 | 0.1 | 0.1 | 0.1 | 0.1 | 0.1 |
| DC 190 | 0.3 | 0.3 | 0.3 | | |
| DC 57 | 0.1 | 0.1 | 0.1 | | |
| Viscosity (Poise, 40° C.) | 17.2 | 18.7 | 21.5 | 18.0 | 18.2 |
| Tensile Modulus (MPa) | 950 | 800 | 830 | 1100 | 1560 |
| Water Uptake (%) | 1.1 | 0.9 | 0.9 | 1.0 | 1.1 |
| Water Absorption (%) | 1.1 | 1.0 | 1.0 | 1.1 | 1.2 |
| Water Extractables (%) | <0.1 | 0.1 | 0.1 | 0.1 | 0.1 |

(TMPTA stands for trimethylolpropane triacrylate)

Thermal stability data were obtained for Formulations 7, 10 and 11. Films of 125 μm were aged in air at 125° C. for one month and the tensile modulus at 25° C. periodically measured. The results are shown in the following Table 5.

TABLE 5

| Formulation | Number of days aged at 125° C. | Tensile Modulus (at 25° C.) (MPa) |
|---|---|---|
| 7 | 0 | 950 |
| | 3 | 1040 |
| | 7 | 1050 |
| | 14 | 1000 |
| | 30 | 1030 |
| 10 | 0 | 1091 |
| | 7 | 1101 |
| | 30 | 1196 |
| 11 | 0 | 1560 |
| | 3 | 1602 |
| | 7 | 1570 |
| | 14 | 1582 |
| | 30 | 1580 |

(accuracy of measurement approximately +/− 50 MPa)

As can be seen, even at 125° C. the modulus of the coatings remains substantially constant in this test.

Hydrolytic stability data were obtained for Formulation 9; these are shown in the following Table 6.

TABLE 6

| Water Temperature = 60° C. | |
|---|---|
| No. of days aged | Tensile Modulus (MPa) |
| 0 | 827 |
| 7 | 837 |
| 14 | 808 |

Formulations from the examples have been successfully coated onto optical fibres. The resins have high cure speeds, allowing high fibre draw rates without the use of excessive numbers of lamps. The coated fibres show a good combination of properties, including excellent low-temperature attenuation, good coating strippability and little change in colour on ageing at 125° C.

We claim:

1. The method of making a radiation cured fiber coating which comprises using an ethylenically-terminated urethane oligomer for the provision of a radiation-cured coating material of an optical fiber, said urethane oligomer being derived from reactants which include a hydroxyl-terminated polyester polyol which has been made by polymerising an acid-component and hydroxyl-component and which has dimer acid residues in its structure, wherein said dimer acid residues are residues derived from (a) the use of a dimer acid as at least part of the acid component or (b) the use of the diol derivative of a dimer acid as at least part of the hydroxyl component or (c) a combination of (a) and (b).

2. The method according to claim 1 wherein the ethylenically-terminated urethane oligomer is a urethane-acrylate oligomer.

3. The method according to either claim 1 or claim 2 wherein the hydroxyl-terminated polyester polyol is a hydroxyl-terminated polyester diol.

4. The method according to either claim 1 or claim 2 wherein said urethane oligomer is made from reactants which include a hydroxyl-terminated polyester polyol, an organic polyisocyanate and a hydroxyl-functional ethylenically unsaturated monomer.

5. The method according to either claim 1 or claim 2 wherein in said hydroxyl-terminated polyester polyol either A: the acid-component residue of said polyester polyol has been derived at least in part from a dimer acid, and the hydroxyl-component residue contains no dimer acid residues, or B: the hydroxyl-component residue of said polyester polyol has been derived at least in part from a diol derivative of a dimer acid, and the acid-component residue contains no dimer acid residues or C both the acid- and hydroxyl component residues of the polyester polyol are comprised at least in part of dimer acid residues, the acid-component dimer acid residue being derived from a dimer acid, and the hydroxyl-component dimer acid residue being derived from the diol derivative of a dimer acid.

6. The method according to claim 1 wherein the dimer acid used for the provision of said dimer acid residues is in hydrogenated form.

7. The method according to either claim 1 or claim 6 wherein the amount of dimer acid residues in said polyester polyol corresponds to a level of dimer acid-based reactants which is in the range of from 30 to 100 weight % base on the total of acid- and hydroxyl-component reactants used in the polyester polyol synthesis.

8. The method according to either claim 1 or claim 2 wherein the number average molecular weight of said urethane oligomer is within the range of from 1000 to 6000.

9. The method according to either claim 1 or claim 2 wherein in said use, said urethane oligomer is a component of a radiation-curable coating composition which includes at least one ethylenically unsaturated monomer which is a liquid solvent for the oligomer and/or at least one multiethylenically unsaturated monomer.

10. The method according to claim 9 wherein said radiation-cured coating material provides the primary coating of an optical fiber.

11. The method according to claim 9 wherein said radiation-cured coating material provides the secondary coating of an optical fiber or provides an encapsulating ribbon coating for a plurality of adjacent optical fibers.

12. The method according to claim 9 wherein said radiation-cured coating material provides an edge-bonding ribbon coating for a plurality of adjacent optical fibers.

13. The method according to claim 1 wherein the number average molecular weight of said polyester polyol is within the range of from 500 to 5000.

14. A coated optical fiber having at least one coating of a radiation-cured coating material which has been formed by radiation-curing a radiation-curable coating composition which comprises an ethylenically-terminated urethane oligomer, said urethane oligomer being derived from reactants which include a hydroxyl-terminated polyester polyol which has been made by polymerising an acid-component and a hydroxyl-component and which has dimer acid residues in its structure, wherein said dimer acid residues are residues derived from (a) the use of a dimer acid as at least part of the acid-component or (b) the use of the diol derivative of a dimer acid as at least part of the hydroxyl component or (c) a combination of (a) and (b).

15. A method for the production of a coated optical fiber, which method comprises applying a radiation-curable coating composition to an optical fiber, which may already have one or more coatings, and radiation-curing the coating composition, and wherein said radiation-curable composition comprises an ethylenically-terminated urethane oligomer, said urethane oligomer being derived from reactants which include a hydroxyl-terminated polyester polyol which has been made by polymerising an acid-component and a hydroxyl-component and which has dimer acid residues in its structure, wherein said dimer acid residues are residues derived from (a) the use of a dimer acid as at least part of the acid-component or (b) the use of the diol derivative of a dimer acid as at least part of the hydroxyl component or (c) a combination of (a) and (b).

* * * * *